United States Patent [19]

Neefe

[11] 4,239,712
[45] * Dec. 16, 1980

[54] METHOD OF MAKING BIFOCAL CONTACT LENSES

[75] Inventor: Charles W. Neefe, Big Spring, Tex.

[73] Assignee: Neefe Optical Laboratory, Big Spring, Tex.

[*] Notice: The portion of the term of this patent subsequent to May 13, 1997, has been disclaimed.

[21] Appl. No.: 20,822

[22] Filed: Mar. 15, 1979

Related U.S. Application Data

[63] Continuation-in-part of Ser. No. 972,526, Dec. 22, 1978, which is a continuation-in-part of Ser. No. 874,934, Feb. 3, 1978, Pat. No. 4,150,073, which is a continuation-in-part of Ser. No. 793,388, May 25, 1977, abandoned.

[51] Int. Cl.$^3$ ............................................. B29D 11/00
[52] U.S. Cl. ..................................... 264/1; 51/284 R; 82/11; 82/18
[58] Field of Search .................. 264/1; 51/284 R, 310, 51/312, 311; 82/1 C, 11, 18, 19

[56] References Cited

U.S. PATENT DOCUMENTS

| | | | |
|---|---|---|---|
| 3,300,909 | 1/1967 | Cooper et al. | 51/284 |
| 3,339,318 | 9/1967 | Graf et al. | 51/310 |
| 3,404,488 | 10/1968 | Cox et al. | 51/284 |
| 3,430,391 | 3/1969 | Borish | 51/284 |

FOREIGN PATENT DOCUMENTS 1281899 10/1968 Fed. Rep. of Germany ............ 51/312

*Primary Examiner*—James B. Lowe

[57] ABSTRACT

A method of making bifocal contact lenses by cutting the distant power on a lathe having an off center rotation to produce a prism lens, removing the lens from the lathe, coating the lens surface with a protective polymer and replacing the lens on a lathe and cutting the near power segment, polishing the near optical segment before removing the protective polymer and means of stabilizing the lens on the eye.

7 Claims, 5 Drawing Figures

METHOD OF MAKING BIFOCAL CONTACT LENSES

Continuation-in-part of application Ser. No. 972,526, filed Dec. 24, 1978 entitled: A METHOD OF MAKING BIFOCAL CONTACT LENSES, which is a Continuation-in-part of Ser. No. 874,934, filed Feb. 3, 1978, now U.S. Pat. No. 4,150,073 entitled: A METHOD OF CONTROLLING THE ADHESION OF A MOLDED PLASTIC LENS, which is a Continuation-in-part of application Ser. No. 793,388, filed May 25, 1977, now abandoned, entitled: A METHOD OF MAKING HIGH QUALITY PLASTIC LENSES.

BACKGROUND OF THE INVENTION

The use of plastic materials for making optical lenses has increased rapidly for the past ten years. This is due to the availability of better plastic materials and the physical advantages of the plastic resins for specific applications such and contact lenses. The technology for the production of high quality contact lenses has not kept pace with the material supply industry. It is important to advance both areas if the full potential is to be realized.

The current lens molds are fabricated from glass, each mold is individually ground and polished to the required specifications. To achieve accurate reproduction of the bifocal molds is most difficult and expensive. This new process makes possible exact reproductions and has many other distinct advantages which will become apparent from the following disclosure.

An object is to provide a process for making inexpensive bifocal contact lenses which may be made to identical specifications.

THE LENSES ARE MADE AS FOLLOWS

A master positive mold having the curvature required on the concave surface of the finished lens is made from glass, stainless steel or other materials which withstand the molding pressures and temperatures. Materials which may be electroplated or plated by vacuum disposition have also been used.

The master positive mold is placed in a sleeve, a molding grade of a resinous material such as polyimide, polycarbonate, polymethylpentene, polyethylene, polypropylene, or other heat softened molding material is also placed in the sleeve. The sleeve and it's continents are heated to the softening point of the molding material, pressure is applied to form the negative lens mold. The sides of the master mold have been cut to a smaller diameter than the sleeve to provide an opening around the mold. When sufficient heat and pressure have been applied, the molding compound will fill the area around the positive mold forming a cup-like cavity with a curved optical surface at the bottom. Either injection or compression molding may be used to produce the negative resinous mold. A liquid or syrup monomer material containing a suitable catalyst is placed over the optical surface of the mold and covered to prevent evaporation of the monomer. The liquid monomer is polymerized within the mold to form a solid monomithic mass. Ultraviolet light, microwave energy or heat may be used to speed the polymerization process. Thermosetting and crosslinked hard materials may be used to produce lenses which are very dimensionally stable and could not be made by injection or compression molding. This process is also suitable for the production of soft contact lenses made from Hydroxethyl Methacrylate which cannot be made by compression or injection molding techniques.

Figure 1:
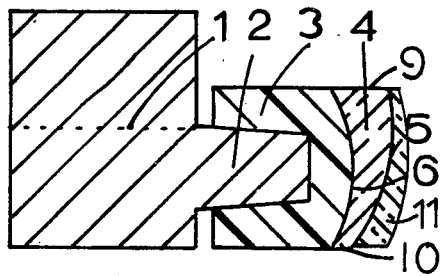
FIG. 1 shows the lens on the lathe with the distant power cut and the protective layer in place.
Figure 2:
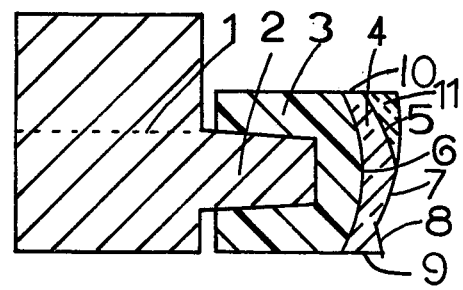
FIG. 2 shows lens replaced on the lathe and the near segment cut, in section.
Figure 3:
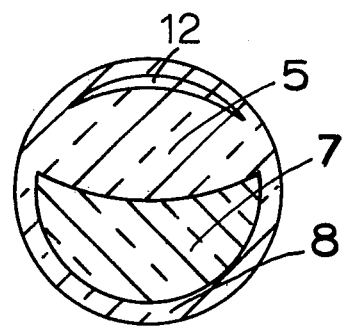
FIG. 3 shows the finished lens from the front.
Figure 4:
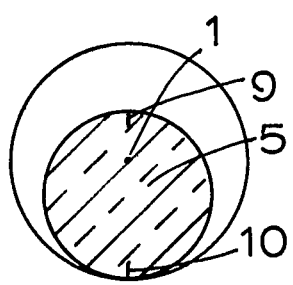
FIG. 4 shows the lens as in FIG. 1 from the front.
Figure 5:
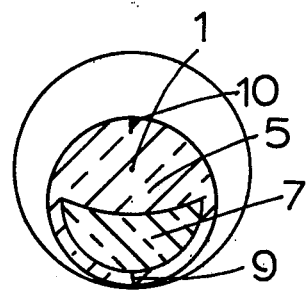
FIG. 5 shows the lens as in FIG. 2 from the front.

It is not necessary to remove the hardened plastic lens material from the mold before cutting the convex bifocal curve. The mold, which is the arbor with the lens mounted, may be placed in a suitable lathe or grinding machine and the convex bifocal curvature cut and polished. A lathe with an off center eccentric male taper, 2 FIG. 1, is used to cut the distant convex refractive power curve, 5 FIGS. 1, 2, 3, 4 and 5. The concave curve, 6 FIGS. 1 and 2, may be molded or cut and polished by methods well known to the art. The taper, 2 FIG. 1, is offset from the center of rotation, 1 FIGS. 1, 2, 4 and 5, to produce a prism lens having a thin apex, 10 FIG. 1, and a thick base, 9 FIG. 1. The distant optical surface, 5 FIG. 1, is polished and coated with a layer of polymer, 11 FIG. 1, to protect the polished surface and provide a smooth uninterrupted surface for polishing the shorter reading segment radius, 7 FIG. 2. Color may be added to the polymer coating to make the reading segment more visible during the cutting operation. The lathe radius is changed to cut the shorter radius of the near refractive curve, 7 FIGS. 2, 3, and 5. The bifocal near refractive curve is cut leaving a rim at the periphery, 8 FIGS. 2 and 3, to provide sufficient edge thickness to prevent the near segment from sliding beneath the lower lid in the reading position. With downward gaze, the lower lid will intersect the thick lower edge of the lens and displace the lens upward and move the reading segment into the visual axis. The thick lower edge also provides the ballast to prevent rotation and to keep the near refractive segment at the bottom. When cutting the near segment the protective polymer layer, 11 FIG. 2, is cut away exposing the lens material in the reading segment area. The protective layer is thick enough to provide a continuous uninterrupted surface, 7 FIG. 2, whereby the polishing is achieved in the conventional method well known to the art. The polymer, 11 FIG. 1, is selected from the acrylics, epoxies, polyesters, or cellulosics. It is understood that the process may be reversed and the distant lens power made without prism or offset and the reading segment cut with prism or offset or the combination of prism and offset in both distant or near segments may be employed. Stabilization may be achieved or enhanced by the use of prism ballast, truncation inferiorly, truncation superiorly, thinning of the upper edge, thinning of the lower edge, thinning of both upper and lower edges, cutting horizontal groves near the upper edge on the convex surface of the lens, cutting vertical groves near the upper edge on the convex surface of the lens, placing holes or slots near the upper edge of the lens. 12 FIG. 3, shows a grove cut on the convex surface near the upper edge. These procedures function due to the fact that the upper lid moves basically vertically during the blink and the lower lid moves basically horizontally during the blink. Truncation is usually employed to aid in stabiliztion of the lens. Lenses are well tolerated in the eye as the thick edge remains at the bottom and the lower lid moves horizontal on the blink cycle. The finished lens now has a molded concave surface and a convex bifocal curvature which was cut and polished without being removed from the disposable mold. The mold has served as a container for the monomer and provided the molded optical surface, which may be aspheric, toric or may be composed of two or more spherical segments. The cup-like mold also serves as the holding block to facilitate cutting to the required thickness. The thickness of the cup bottom may be measured before adding the liquid monomer and measurements may be taken during the cutting operation and the lens thickness determined by subtracting the thickness of the cup bottom. The mold also serves as a holding fixture during the polishing operation. The lens is supported by the optical surface present on the mold; therefore, the lens material must adhere strongly to the supporting mold in order to withstand the forces of cutting and polishing.

After the lens is processed to the required specifications, the lens is removed by heating the resinous holding fixture to slightly soften the resinous mold material but not softening the crosslinked cast lens material. The heat softened mold is flexed by applying pressure, distorting and stretching the surface of the softened material away from the hard rigid lens material, separating the finished optical lens from it's support.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of making a bifocal lens comprising the steps of: Providing a positive lens mold having a first surface curvature corresponding to the curve required on one surface of the finished lens, and a second surface corresponding to the edge surface of the finished lens with the second surface extending from the first surface curvature a distance greater than the height of the thickness of the lens, forming a negative mold from the positive mold by applying a softened resinous material against the first surface curvature and the second surface of the positive mold to form an open top cylinder from the resinous material with an image of the first surface curvature as the bottom of the cylinder and the image of the second surface as the walls of the cylinder, removing the positive lens mold from the negative lens mold, filling the resinous cylinder of the negative mold with a liquid monomer lens material allowing the liquid monomer lens material to polymerize to form a solid monolithic mass within the resinous cylinder of the negative mold having one finished optical surface molded by the negative image of the first surface curvature formed in the bottom of the resinous cylinder, providing an eccentric rotation while cutting and polishing a second optical surface on the polymerized lens material, to produce a prism lens having a thin apex and thicker base, while the lens material is supported within the resinous cylinder, covering the polished surface of the prism lens with a protective layer of polymer material placing the lens a second time upon the eccentric with the thin apex positioned at the same location that the thicker base was positioned the first time, and the second position of the thick base being the same as the first position of the thin apex, cutting a third optical surface having a selected radius shorter than the second radius, polishing the third radius, removing the lens from the resinous cylinder of the negative mold and removing the protective polymer layer.

2. A method as in claim 1, wherein the resinous mold is heated before removing the lens.

3. A method as in claim 1, wherein the first surface is cut having no prism and second surface is cut having prism.

4. A method as in claim 1, wherein the first surface is cut having prism present and the second surface is cut having no prism.

5. A method of making bifocal lenses by the steps of providing an eccentric rotation while cutting and polishing a first optical surface on the polymerized lens material, to produce a prism lens having a thin apex and a thicker base, covering the polished surface of the prism lens with a protective layer of polymer material, placing the lens, a second time upon the eccentric with the apex positioned at the same location that the thicker base was positioned the first time, and the second position of the thick base being the same as the first position of the thin apex, cutting a second optical surface having a selected radius shorter than the first radius, polishing the second radius, removing the protective polymer layer from the lens.

6. A method as in claim 5, wherein the first surface is cut having no prism and the second surface is cut having prism.

7. A method as in claim 5, wherein the first surface is cut having prism present and the second surface is cut having no prism.

* * * * *